UNITED STATES PATENT OFFICE.

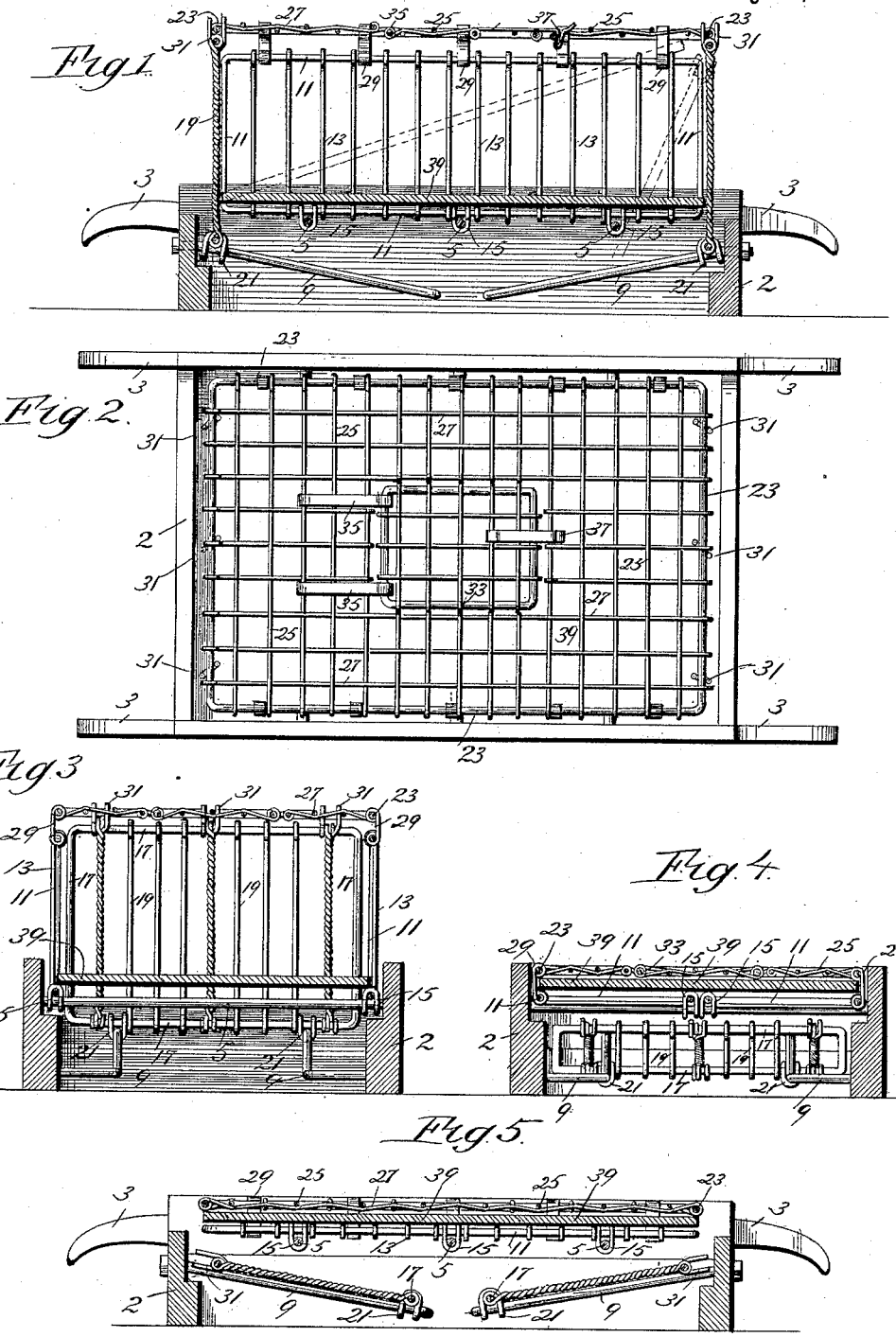

JAMES CAIN AND GEORGE W. MANN, OF MINNEAPOLIS, MINNESOTA.

POULTRY-CRATE.

SPECIFICATION forming part of Letters Patent No. 431,032, dated July 1, 1890.

Application filed November 20, 1889. Serial No. 330,976. (No model.)

*To all whom it may concern:*

Be it known that we, JAMES CAIN and GEORGE W. MANN, of Minneapolis, in the county of Hennepin and State of Minnesota, have invented a certain new and useful Poultry-Crate, of which the following is a specification.

This invention relates to crates that are designed especially for shipping poultry; and our object is to provide a crate that can be readily knocked down so as to occupy a small space when not in use or when being shipped empty.

In the accompanying drawings, forming part of this specification, Figure 1 is a longitudinal vertical section of a crate embodying our invention. Fig. 2 is a plan of the same. Fig. 3 is a transverse vertical section. Fig. 4 is a transverse vertical section of the crate "knocked down." Fig. 5 is a longitudinal section of the crate knocked down.

In the drawings, 2 represents an open rectangular frame, preferably provided at its corners with suitable handles 3. Rods 5 extend across the frame, being secured in the side walls of the frame at points below its top. Inclined rods 9 extend from each end wall of the frame to a point near the center thereof, the inner end of each of such rods being turned outward and secured to the side wall, as shown in Figs. 3 and 4. Side walls, formed, preferably, of a rectangular frame 11 and wires 13, are secured at their lower edges upon the cross-rods 5 by means of links 15, that are secured to the frame and pass around said rods. End walls, formed similarly of rectangular frames 17 and wires 19, are secured at their lower edges to the rods 9 by means of links 21. A cover or top, formed, preferably, of a rectangular frame 23 and cross-rods 25 and longitudinal rods 27, has its side edges connected to the tops of the side walls by means of links 29. The end walls are provided at their tops with open or U-shaped clasps 31, which, when the walls are in a vertical position, as shown in Fig. 1, straddle the wire or rod forming the frame of the cover. The top is also preferably provided with a door or cover 33, having hinges 35, and a fastening-hook 37. When the crate is in use, a seal may be placed upon this door. The crate is also provided with a bottom 39, which, when the crate is in position for use, rests between the lower ends of the walls, as shown in Fig. 1.

In using the crate the parts are in the position shown in Fig. 1, and the walls are locked in this position by the bottom 39, which rests between them. When it is desired to knock down the crate, one end of the bottom is raised into the position shown by dotted lines in Fig. 1. The wall at this end of the crate is then pushed inward at the bottom and its lower end slides inward and downward over the inclined rods 9. The clasp at the upper end disengages from the frame-work of the cover and the further movement of the wall carries it into the position shown in Fig. 5, where it lies wholly within the frame 2. The other end of the cover is then raised and the other end wall is knocked into a similar position. The bottom now lies close under the top of the crate and the lower edges of the side walls are moved inward, sliding on the transverse rods 5 until they are brought to a horizontal position beneath the bottom of the crate, as shown in Figs. 4 and 5. The crate is now knocked down, the top of the cover being flush with the top of the frame 2.

For setting up the crate the movements of the various parts are reversed.

We claim as our invention—

1. The combination, with the frame 2, of the transverse and longitudinal rods secured to said frame, the end walls having their lower edges hinged to said longitudinal rods and free to slide thereon, the side walls having their lower edges secured to said transverse rods and free to slide thereon, the top connected to said side walls, and the movable bottom arranged within said walls, substantially as described.

2. The combination, with the frame 2, of the inclined rods 9 and the transverse rods 5, arranged therein, the side walls connected at their lower edges to said transverse rods by the links 15, the top connected to said side walls by the links 29, the end walls connected to said inclined rods by links 21, and provided at their tops with the clasps 31, and the movable bottom 39, arranged within said walls, substantially as described.

In testimony whereof we have hereunto set our hands this 13th day of November, 1889.

JAMES CAIN.
GEORGE W. MANN.

In presence of—
A. M. GASKILL,
S. W. ROBERTS.